United States Patent [19]
Gibbons et al.

[11] 4,085,076
[45] Apr. 18, 1978

[54] CARBOHYDRATE-BASED CONDENSATION RESIN

[75] Inventors: John P. Gibbons, Western Springs; Lawrence Wondolowski, Downers Grove, both of Ill.

[73] Assignee: CPC International Inc., Englewood Cliffs, N.J.

[21] Appl. No.: 808,580

[22] Filed: Jun. 21, 1977

Related U.S. Application Data

[63] Continuation-in-part of Ser. No. 707,600, Jul. 22, 1976, Pat. No. 4,048,127.

[51] Int. Cl.² .................................................. C08L 3/02
[52] U.S. Cl. ...................................... 260/17.2; 260/9; 260/17.3
[58] Field of Search ............................ 260/17.2, 17.3

[56] References Cited
U.S. PATENT DOCUMENTS

| | | | |
|---|---|---|---|
| 1,593,342 | 7/1926 | Meigs | 260/17.2 |
| 1,801,052 | 4/1931 | Meigs | 260/17.2 |
| 1,815,930 | 7/1931 | Novotny | 260/17.2 |
| 1,820,816 | 8/1931 | McIntosh | 260/17.2 |
| 2,341,907 | 2/1944 | Cheetham | 260/17.2 |
| 2,362,086 | 11/1944 | Meyers et al. | 260/17.2 |
| 2,555,058 | 5/1951 | Rouzet | 260/17.2 |

OTHER PUBLICATIONS

Chem. Absts., vol. 81 : 79466k, "Electroplate Coating," Akerblom.

*Primary Examiner*—Edward M. Woodberry
*Attorney, Agent, or Firm*—David H. LeRoy; John P. Floyd

[57] ABSTRACT

A carbohydrate-phenolic resol resin and a process for production of same wherein an aldose saccharide, preferably a hexose, is reacted with a phenolic compound and urea in the presence of an acid catalyst to form a liquid fusible resin which is reacted with a lower aliphatic aldehyde in the presence of a basic catalyst to form said resol resin.

12 Claims, No Drawings

CARBOHYDRATE-BASED CONDENSATION RESIN

This application is a continuation-in-part of U.S. Serial No. 707,600 filed July 22, 1976, and now patent No. 4,048,127 issued Sept. 13, 1977.

This invention relates to carbohydrate-based condensation resol resin and a process for producing same, and more particularly to carbohydrate-phenol liquid condensation resins incorporating polyfunctional nitrogen-containing compounds as coupling agents, and to reaction of the liquid resin with a lower aliphatic aldehyde to produce resol resins.

Condensation resins based upon phenol and aliphatic aldehydes and based upon urea and aliphatic aldehydes have been used for many years in the plastics industry. As is now well established, the aldehyde, usually formaldehyde, is reacted with phenol or urea in the presence of an acid or basic catalyst to form a condensation resin. The formaldehyde serves as a coupling agent, interconnecting the phenol or urea molecules.

For example, in a phenol-formaldehyde resin, the polymeric matrix includes the following groups:

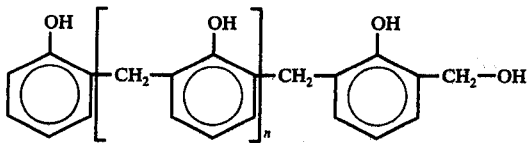

The formaldehyde serves a similar coupling function in urea formaldehyde resin which contains groups of the following type:

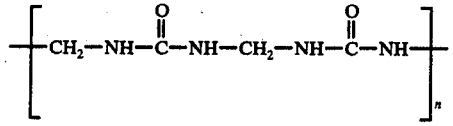

wherein $n$ is related to the molecular weight of the resin.

The basic raw material for condensation resins of the type described above is petroleum. As is now well known, supplies of petroleum are becoming increasingly limited, and prices have increased significantly. There is thus a need to replace at least a portion of the petroleum-based components of condensation resins of the type described above with a less expensive, more abundant material. Carbohydrates, readily available from plant sources, are thus one type of renewable resource ideally suited for use in the manufacture of plastics.

It has been proposed, as described in U.S. Pat. Nos. 1,593,342; 1,753,030; 1,801,053; 1,868,216; and 1,923,321, to employ carbohydrates, such as dextrose, starch and the like, in phenol condensation resins whereby the carbohydrate, in effect, is substituted for a portion of the petroleum-based material, usually phenol. However, resins of the sort described in the foregoing patents are, for the most part, prepared by reaction of the carbohydrate with phenol, occasionally in the presence of an aldehyde or a nitrogen-containing compound, such as aniline and amino phenol. The result is that the amount of carbohydrate which can be used in the resin is limited by the somewhat lower reactivity of the carbohydrate.

It is accordingly an object of the present invention to produce and provide a method for producing a low cost resin system incorporating a carbohydrate with relatively high levels of substitution.

It is a more specific object of the present invention to produce a carbohydrate-phenol resin in which the phenol is partially replaced by the carbohydrate material to produce a soluble liquid resin and to provide a method for producing a carbohydrate-ureide-phenol resol resin.

The concepts of the present invention reside in a carbohydrate-phenolic resin produced by reaction of an aldose saccharide, a phenolic compound and urea in the presence of an acid catalyst. When the reaction of the present invention is stopped at a liquid stage, this resin can then be reacted with an aldehyde to form a resol resin. Nevertheless, a solid fusible resin may be produced by allowing the first stage reaction to continue. In accordance with the concepts of this invention, the resins can embody relatively high levels of carbohydrate without sacrificing the physical properties of the resulting resin. The solid fusible resin systems of the invention are characterized by good water resistance and improved strength properties. The resol resins of the present invention are excellent adhesives for plywood and the like.

Unlike the prior art efforts to react a phenolic compound with a carbohydrate, the present invention utilizes urea as a coupling agent which is believed to link the carbohydrate component with the phenol, thereby minimizing the amount of the most expensive reagent, phenol, necessary to produce a solid fusible resin. Without limiting the present invention as to theory, it is believed that, using dextrose as illustrative of the carbohydrate, the carbohydrate forms a diureide which is then reacted with the phenol. This postulated mechanism may be illustrated by way of the following reaction in which the dextrose is dehydrated to hydroxymethyl furfural, and then the hydroxymethyl furfural is reacted with urea to form a diureide:

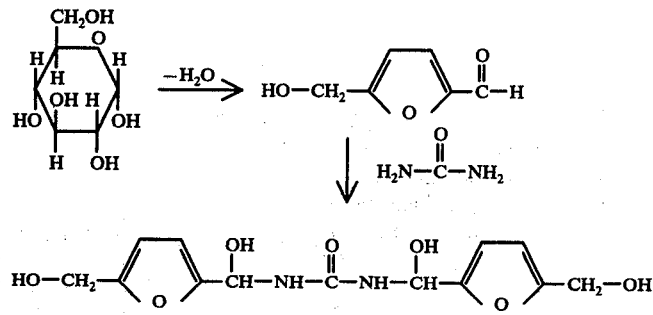

and/or

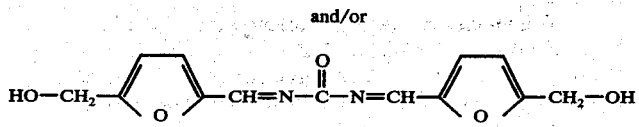

The resulting diureide is then capable of reaction with phenol to yield a resin believed to contain the following groups:

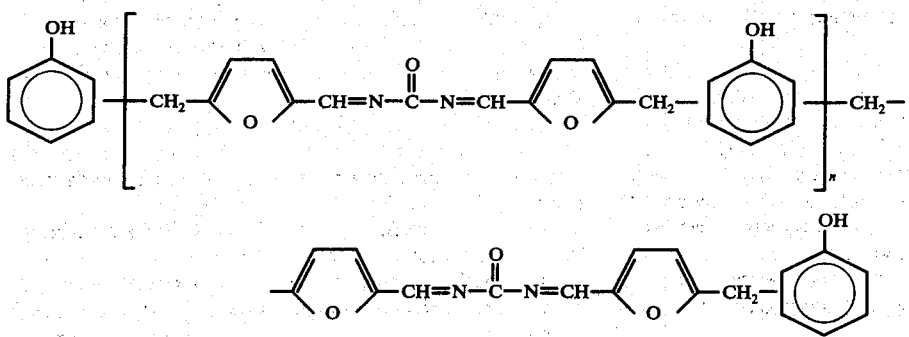
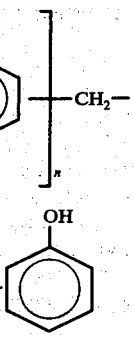

The foregoing postulated structure shows that, using urea as a coupling agent in accordance with the concepts of this invention, use can be made of 1 mole of dextrose for every mole of phenol employed. That permits the amount of phenol employed in the resin to be cut in half, if desired, with a concomitant reduction in the cost of the resin, or without sacrificing physical properties of the resin.

In the practice of this invention, the preferred carbohydrate is dextrose, although a variety of other carbohydrates can be used as desired. In general, use can be made of aldose saccharides containing 1 to $10^6$ saccharide units per molecule, with the preferred aldoses being hexoses. Included are dextrose, maltose, maltotriose, lactose, sucrose, glycogen, glucosides, corn syrup, low D.E. hydrolyzed cereal solids and the like.

Also included as the carbohydrate useful in the practice of this invention are the various starches containing as many as $10^6$ repeating units. Such starches can be represented by the structure:

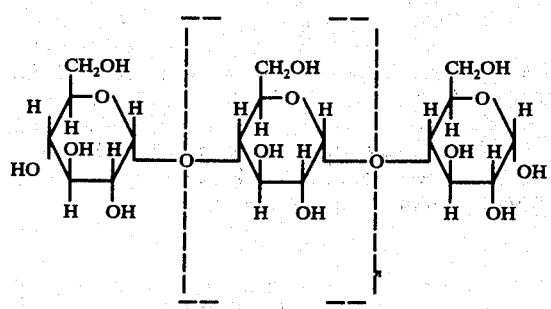

wherein $n$, designating the number of repeating units, can range from up to $10^6$. Starches suitable for use in the practice of this invention include all varieties of starch, such as corn starch, tapioca starch, wheat starch, grain sorghum, potato starch, rice starch, sago, etc., as well as types and grades thereof including waxy starches, high amylose starches, chemically modified starches, dextrins, thin boiling starches and pregelatinized starches.

Also included are crude starches, such as mill starch, corn flour, wheat flour, brewers grits, broken rice, etc.

As the phenolic compound used in the practice of this invention, preferred are the phenolic compounds having the formula:

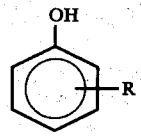

wherein R is a group selected from $C_1$ to $C_3$ alkyl, $C_1$ to $C_3$ alkoxy, halogen, hydroxy and hydrogen. The preferred phenolic compound is phenol, but other phenolic compounds include cresol, chlorophenol, bromophenol, resorcinol and the like.

The relative proportions of reactants employed in the practice of this invention can be varied within relatively wide limits. One of the advantages of the present invention stems from the fact that use can be made of 1 mole of the carbohydrate for every mole of phenol employed, although it will be understood that, if desired, use can also be made of greater amounts of phenol. In general, the amount of phenol employed ranges from 0.1 to 10 moles of phenolic compound for each mole of carbohydrate employed, and preferably 0.1 to 1.5 moles of phenolic compound per mole of carbohydrate. As will likewise be appreciated by those skilled in the art, the proportions of urea employed depend upon the proportions of phenolic compound based on the carbohydrate. In general, use can be made of 0.1 to 5 moles of urea for each mole of carbohydrate, and preferably 0.2 to 0.8 moles of urea per mole of carbohydrate.

For producing a resol resin according to this invention, we prefer to use a liquid resin wherein the phenol, carbohydrate, and urea components are maintained within the aforementioned range.

The acid catalysts used in the practice of this invention are typical of those acid catalysts employed in the condensation of aldehydes with phenols and urea.

Included are the strong mineral acids such as sulfuric acid, hydrochloric acid, etc.; sulfonics include paratoluene sulfonic acid, naphthalene sulfonic acid, etc.; sulfur trichloride, antimony chloride; as well as a number of others, all of which are well known to those skilled in the art.

In carrying out the reaction in the practice of this invention, it is possible to form the diureide prior to reaction with the phenolic compound, although it has been found that there is frequently no advantage in doing so. It is sufficient to simply place the reactants in a reaction vessel in the presence of an acid catalyst and then heat the reaction mixture to a temperature sufficient to cause the condensation reaction to occur. In general, use can be made of reaction temperatures ranging from 70° to 200° C. with the length of time of the reaction depending upon the reaction temperature.

The resulting solid-fusible resin is a brittle material which can be thermoset by the addition of a suitable cross linking agent, preferably hexamethylenetetramine. The resins thus produced are thermosetting and find widespread use as molding and foundry resins. They are characterized by excellent water resistance and improved properties, particularly tensile strengths.

The liquid resin used for production of resol resins is easy to handle and provides a desirable viscosity for mixing and adding the aldehyde reactant and the alkaline catalyst for production of the resol resin. Moreover, it has been found that the liquid state of the resin or the dextrose-diureide-phenol resin can be controlled by monitoring the amount of water produced. We prefer to control the water produced by condensation to below about 5.0 moles water in the reaction. Attempts to resolubilize the solid-fusible resins by reaction with formaldehyde proved difficult to impossible since viscosity remained at impractical levels.

While not equivalent to urea in the practice of this invention, use can also be made of polyfunctional amines as the coupling agent in place of urea. Such amines include amines of the formula:

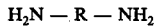

$$H_2N - R - NH_2$$

wherein R is a divalent organic group, preferably an alkylene group containing 2 to 10 carbon atoms (e.g., dimethylene, trimethylene, tetramethylene, etc.) or an arylene group such as phenylene and phenylene-substituted with a $C_1$ to $C_3$ alkyl group, $C_1$ to $C_3$ alkoxy group, etc.

It will also be appreciated by those skilled in the art that various additives can be incorporated into the reaction mixture. For example, it has been found that the addition of fatty acid amines, preferably containing 12 to 22 carbon atoms, can be added to the reaction vessel during the reaction to further increase water resistance and final thermoset resin moldability. For this purpose, use can be made of a variety of fatty acid amines commercially available, including, for example, ARMEEN T-Tallow amine, a long chain fatty acid amine from Armak.

For the production of the resol resin of this invention, it has been found that best results can be obtained when the amount of aliphatic aldehyde (i.e., formaldehyde, acetaldehyde or propionaldehyde) ranges from about 2 moles to about 4 moles for each mole of phenol.

The use of a basic catalyst in the reaction of the liquid resin to form a resol resin is an important concept of the invention. Any of a number of basic catalysts can be used in the practice of this invention, all of which are well known to those skilled in the art. Included are the alkali metal hydroxides (e.g. sodium hydroxide, potassium hydroxide, etc.), alkaline earth metal oxides and hydroxides (e.g. calcium oxide, barium oxide, magnesium oxide, etc.) as well as ammonia and like bases. In general, the basic catalyst should be used in an amount sufficient to adjust the pH of the second stage reaction medium to at least 8.0.

This invention is further illustrated by the following examples, which, however, are not to be taken as limiting in any respect. All parts and percentages, unless expressly stated to be otherwise, are by weight.

EXAMPLE 1

This example illustrates the practice of this invention, using dextrose, urea and phenol as the reactants.

A 1000 ml reaction flask equipped with a condenser, stirrer and thermometer is charged with 360 g. of dextrose, 60 g. of urea and 208 g. of 90% phenol, corresponding to a mole ratio of dextrose-urea-phenol of 1:0.5:1.

2.5 ml of 5N sulfuric acid catalyst are added to the reaction flask, and the flask heated to a temperature varying between 123° and 182° C. for about 8.6 hours. During that time, 171 ml of water are collected from the reaction vessel.

The resulting resin, a solid black material at room temperature, is recovered from the reaction vessel.

EXAMPLE 2

This example illustrates the use of starch as the carbohydrate in the preparation of a carbohydrate-phenol condensation resin.

A 500 ml reaction flask is charged with 184 g. of starch (Argo Code 3005), 104 g. of 90% phenol, 100 g. of water and 14 g. of 5N $H_2SO_4$.

The resulting mixture is stirred initially at 95° to 114° C. to hydrolyze the starch and thereby form a black solution from which 105 ml of water are collected.

At this stage, 30 g. of urea is added to the flask, and the condensation reaction proceeds at a temperature varying from 114° to 183° C. over a period of 6.4 hours. During the latter period, an additional 101 ml of water are recovered from the reaction vessel.

The resulting resin weighs 210 g. and is a brittle solid at room temperature.

EXAMPLE 3

Using the apparatus and procedure described in Example 2, 360 g. of dextrose, 60 g. urea, 204 g. 90% phenol and 9.6 g. of 5N $H_2SO_4$ are charged to the reaction vessel. Water of condensation, totalling 206 ml is collected over a period of 9.1 hours while the reaction temperature of the vessel varies between 118° to 185° C.

Recovered from the reaction vessel are 380 g. of a black resin, brittle at room temperature.

EXAMPLE 4

This example illustrates the practice of this invention wherein the resin is prepared in the presence of a fatty acid amine to improve the water resistance of the resin and the final thermoset resin moldability.

Into a 500 ml flask, there is charged 180 g. of dextrose, 30 g. of urea, 104 g. of 90% phenol, 9 g. of ARMEEN T-Tallow amine and 1.4 g. of 5N $H_2SO_4$. The reactants are cooked in the reaction vessel at a temperature from 129° to 189° C. for a period of 4.9 hours; during that time, 97.5 ml of water of condensation are collected.

The resulting resin is separated from the reaction vessel, and is a black material, brittle at room temperature.

EXAMPLE 5

This example illustrates the effect of varying the dextrose-urea-phenol molar ratios on physical properties, namely, water resistance and resin moldability.

(a) In the first test, a 1:1:1 molar ratio of dextrose-urea-phenol is made by adding 180 g. of dextrose, 60 g. of urea, 104 g. of 90% phenol and 2.8 g. of 5N $H_2SO_4$ to the reaction flask. The reaction temperature varies from 127° to 194° C. and 112 ml of water of condensation is recovered in 6.1 hours.

(b) In the next test, the molar ratio of dextrose-urea-phenol is 1:0.75:1, with 180 g. of dextrose, 45 g. of urea, 104 g. of 90% phenol, and 1.4 g. of 5N $H_2SO_4$ being added to the reaction vessel. The condensation reaction is run for 4.7 hours at 130° to 180° C. while collecting 98.5 ml water of condensation.

(c) In this test, the mole ratio is 1:0.25:1 obtained by using 180 g. of dextrose, 15 g. of urea, 104 g. of 90% of ARMEEN T and 1.4 g. of 5N $H_2SO_4$. The temperature ranges from 129° to 180° C. for 4.8 hours, with 91 ml water of condensation being collected.

EXAMPLE 6

This example illustrates the use of toluene diamine as the nitrogen-containing coupling agent.

Using the procedure described in Example 1, there is charged to a 500 ml flask, 180 g. of dextrose, 61.1 g. of toluene diamine, 104 g. of 90% phenol and 1.4 g. of 5N $H_2SO_4$. The reactants are maintained at 113° to 186° C. for 4.2 hours, during which 79 ml water of condensation are obtained.

The black resin, weighing 260 g. was obtained, and brittle at room temperature.

EXAMPLE 7

This example illustrates the use of ethylene diamine as the polyfunctional amine coupling agent in the practice of this invention.

Using the procedure described in Example 6, a reaction mixture is formed of 180 g. of dextrose, 30 g. of ethylene diamine, 104 g. of 90% phenol, and 1.4 g. of 5N $H_2SO_4$ as the catalyst. The reaction occurs over 5 hours, while the temperature varies from 111° to 178° C. A total of 96 ml water of condensation are recovered.

The resulting resin is a black material, brittle at room temperature.

EXAMPLE 8

This example illustrates the use of the resins prepared in accordance with the concepts of this invention in molding applications, indicating the physical properties obtainable in the practice of the invention.

Each of the resins from Example 1 through 4, 5(a), 5(b), 5(c), 6 and 7 is compounded in accordance with the following recipe:

| | |
|---|---|
| Resin | 46 g. |
| Hexamethylenetetramine | Varied quantities as indicated |
| Calcium stearate | 2.0 g. |
| Calcium oxide | 2.0 g. |
| Wood flour | 46 g. |

Each of the resins are compounded with the above recipe and milled at 200° F. for 2 minutes. The recipe is then formed into bars (5 × 0.5 × 1/8 inches) by molding at 350° F. for 5 minutes.

The resulting test bars are then tested to determine their water resistance, first by contacting the test bars with boiling water for 2 hours, and in another test, by immersion in water for 24 hours in accordance with ASTM D570-63 (6a). The bars are also tested to determine their flexural modulus. The results of those tests are set forth in the following table:

| | | | Water Resistance | | | | |
|---|---|---|---|---|---|---|---|
| | | | 2 Hr. Boiling Water | | ASTM D570-63 (6a) 24 Hr. Immersion | | Flexural |
| | Example | Hexa, % | % $H_2O$ Absorbed | % Weight Loss | % $H_2O$ Absorbed | % Weight Loss | Modulus psi × $10^5$ |
| 1. | Dextrose-Urea- | 7.8 | 6.48 | 1.48 | 1.24 | 0.19 | 11.3 |
| | Phenol, 1:0.5:1 | 10.0 | 5.05 | 1.03 | 1.16 | 0.18 | 11.1 |
| | Molar Ratio | 20.0 | 5.66 | 3.34 | 2.18 | 1.07 | 11.1 |
| 2. | Starch-Urea- | 5.0 | 7.35 | 2.10 | 1.86 | 0.44 | 11.4 |
| | Phenol, 1:0.5:1 | 10.0 | 5.55 | 1.04 | 1.84 | +0.07 | 11.2 |
| | Molar Ratio | 20.0 | 7.12 | 3.59 | 3.99 | 0.74 | 10.6 |
| 3. | Dextrose-Urea- | 7.8 | * | 3.81 | 4.52 | 0.70 | 8.2 |
| | Phenol, 1:0.5:1 | 10.0 | 3.17 | 0.85 | 1.24 | 0.15 | 10.8 |
| | Molar Ratio | 20.0 | 5.52 | 4.39 | 2.97 | 1.71 | 10.3 |
| 4. | Dextrose-Urea- | 7.8 | 3.49 | 0.39 | 1.08 | 0.22 | 9.4 |
| | Phenol Tallow | 10.0 | 3.38 | 0.31 | 1.32 | 0.12 | 9.7 |
| | Amine, 1:0.5:1 Molar Ratio | 20.0 | 4.47 | 1.61 | 1.98 | 0.30 | 10.3 |
| 5(A) | Dextrose- | 5.0 | 5.70 | 2.48 | 1.54 | 0.47 | 10.6 |
| | Urea-Phenol, | 7.6 | 5.32 | 2.63 | 1.18 | 0.59 | 11.9 |
| | 1:1:1 Molar Ratio | 10.0 | 6.34 | 3.20 | 2.76 | 0.78 | 9.5 |
| 5(B) | Dextrose- | 5.0 | 5.78 | 1.61 | 1.57 | 0.66 | 9.3 |
| | Urea-Phenol, | 7.6 | 5.45 | 3.45 | 1.67 | 0.86 | 11.6 |
| | 1:0.75:1 Molar Ratio | 10.0 | 5.83 | 4.89 | 1.98 | 1.46 | 11.7 |
| 5(C) | Dextrose- | 5.0 | 6.61 | 1.02 | 1.87 | 0.08 | 8.5 |
| | Urea-Phenol, | 7.6 | 5.82 | 0.84 | 1.65 | 0.07 | — |
| | 1:0.25:1 Molar Ratio | 10.0 | — | — | — | — | — |
| 6. | Dextrose- | 3.0 | 8.48 | 2.50 | 3.15 | 1.60 | 7.6 |
| | Toluene- | 5.6 | — | — | — | — | — |
| | Diamine-phenol, 1:0.5:1 Molar Ratio | 7.0 | — | — | — | — | — |

-continued

| Example | Hexa, % | Water Resistance | | | | Flexural Modulus psi × 10$^5$ |
|---|---|---|---|---|---|---|
| | | 2 Hr. Boiling Water | | ASTM D570-63 (6a) 24 Hr. Immersion | | |
| | | % H$_2$O Absorbed | % Weight Loss | % H$_2$O Absorbed | % Weight Loss | |
| 7. Dextrose-Ethylene-Diamine-phenol, 1:0.5:1 Molar Ratio | 5.6 | 9.13 | +0.42 | 2.99 | 0 | 9.6 |
| | 7.0 | 13.38 | +3.95 | 3.98 | 0.81 | 10.6 |
| | 10.0 | 8.39 | +0.61 | 2.42 | 0.07 | 10.7 |

*Data for the sample was considered not representative, and discarded. As can be seen from the foregoing table, the resins of this invention have good water resistance as well as excellent strength properties.

EXAMPLE 9

This example is provided for comparative purposes and illustrates the use of a monofunctional amine compound, aniline, in accordance with the practice of the prior art.

(a) A 1000 ml reaction flask of the type utilized in Example 1 is charged with 183 g. of dextrose, 93 g. of aniline, 103 g. of 90% phenol and 1.5 g. of 5N H$_2$SO$_4$. The condensation reaction continues for 145 minutes at temperatures varying from 109° to 183° C. A total of 95 ml of water of condensation is collected.

(b) Using the same procedure as described above, 180 g. of dextrose, 53 g. of 90% phenol, 94 g. of aniline and 1.3 g. of 5N H$_2$SO$_4$ are charged to a reaction vessel. The reaction occurs over 4.7 hours at reaction temperatures ranging from 113° to 168° C. A total of 83 ml of water of condensation is collected during the reaction.

(c) Using the same procedure as described in Example 8, the resin is compounded, milled and molded into bars as described in that example. The bars are subjected to the same physical tests described in Example 7 with the following results:

| Example | Hexa, % | Water Resistance | | | | Flexural Modulus psi × 10$^5$ |
|---|---|---|---|---|---|---|
| | | 2 Hr. Boiling Water | | ASTM D570-63 (6a) 24 Hour Immersion | | |
| | | % H$_2$O Absorbed | % Weight Loss | % H$_2$O Absorbed | % Weight Loss | |
| 9(A) | 7.8 | 3.55 | 1.09 | 0.89 | 0.0 | 10.3 |
| | 10.0 | 3.32 | 0.74 | 0.93 | 0.07 | 10.3 |
| | 20.0 | 6.79 | 11.25 | 3.09 | 3.2 | 10.2 |
| 9(B) | 7.8 | 4.45 | 1.79 | 1.19 | 0.10 | 8.9 |
| | 10.0 | 5.00 | 2.40 | 1.31 | 0.32 | 9.2 |
| | 20.0 | 7.37 | 4.51 | 3.88 | 1.65 | 9.2 |

As can be seen from the foregoing data using aniline as in the prior art, the resulting test bars have excellent water resistance, but have a strength, expressed as flexural modulus, less than that achieved using urea as the coupling agent.

EXAMPLE 10

This example illustrates the use of corn flour as the carbohydrate employed in the practice of this invention.

A 500 ml. reaction flask was charged with the following ingredients: 184 g. starch (yellow corn flour), 104 g. phenol (90% d.b.), 30 g. urea, and 40 g. 5N H$_2$SO$_4$. The starch was added to the flask in two increments and hydrolysis allowed to proceed over a period of 3 hours whereby the urea was then added. The condensation reaction occurred over a period of 8.2 hours at a temperature of 112° – 186° C. while collecting 118 ml of water. A black, brittle solid (yield 223 g.) at room temperature was obtained. The product was compounded, milled and tested for water resistance and strength properties as given below:

| Example | Hexa, % | Water Resistance | | | | Flexural Modulus psi × 10$^5$ |
|---|---|---|---|---|---|---|
| | | 2 Hr. Boiling Water | | 24 Hr. Immersion | | |
| | | % H$_2$O Absorbed | % Weight Loss | % H$_2$O Absorbed | % Weight Loss | |
| 10 | 7 | 7.00 | 0.62 | 2.03 | 0.05 | 12.0 |
| | 10 | 6.10 | 0.80 | 2.37 | +0.19 | 11.4 |
| | 20 | 7.28 | 3.92 | 4.25 | 1.20 | 10.4 |

As will be appreciated by those skilled in the art, it is possible, and sometimes desirable, in the practice of this invention, to form the diureide prior to the reaction with the phenolic compound. This concept of the invention may be illustrated by reference to the following example.

EXAMPLE 11

Diglucose ureide was prepared according to the directions in U.S. Pat. No. 2,967,859.

The reaction of Example 3 was repeated using diglucose ureide in place of dextrose and urea. Water evolution was slower requiring 20 hours for completion. From 110 g. of the diglucose ureide was obtained 133 g. of black product.

When resins were prepared from the product in the usual manner, they showed the following properties:

| Example | Hexa, % | Water Resistance | | | | Flexural Modulus psi × 10⁵ |
|---|---|---|---|---|---|---|
| | | 2 Hr. Boiling Water | | 24 Hr. Immersion | | |
| | | % H₂O Absorbed | % Weight Loss | % H₂O Absorbed | % Weight Loss | |
| 11 | 7.0 | 3.70 | 0.0 | 0.77 | 0.05 | 10.4 |
| | 10.0 | 2.95 | 0.0 | 0.91 | 0.0 | 10.5 |
| | 20.0 | 3.32 | 0.68 | 1.2 | 0.0 | 10.1 |

EXAMPLE 12

This example illustrates the preparation of the resol resin of this invention by reacting the dextrose-diureide phenol liquid resin and formaldehyde to form a resol resin.

270 g. dextrose, 45 g. of urea, and 156 g. of phenol (90% by weight) was added to a reaction flask and 13.5 g. of 5.0 Normal $H_2SO_4$ was added to serve as a catalyst. Reaction was allowed to proceed at 125° C. to 153° C. for 4 hours during which time 112 g. of water was collected using a water cooled condenser. This resin was a dark liquid product.

The liquid resin was cooled to about 90° C. and the water of condensation returned to the reaction flask. At this point 13.0 g. of calcium hydroxide was added to neutralize the acid and to provide a basic catalyst system. Reaction temperature was cooled to about 70° C. and 450 g. of aqueous 35% (by weight) formaldehyde was added.

The reaction was held with stirring until the exotherm subsided. The reaction mixture was then held for about 1 hour at about 80° C. The resol resin was then cooled to room temperature and was a liquid product having a viscosity of about 500 centipoise. Final solids content was 49.4% by weight.

As can be seen, the molar ratio of reactants in this example for the preparation of the intermediate resin is about 1 mole dextrose: 0.5 mole urea: 1 mole phenol and for the resol stage about 3.5 mole formaldehyde per mole phenol.

EXAMPLE 13

A resol resin prepared as shown in Example 12 was used as a plywood adhesive wherein the adhesive formulation was prepared in the following order:

| | |
|---|---|
| Distilled Water | 86.3 g. |
| Hard Wheat Flour | 9.0 |
| Norprofil (a filler) | 27.0 |
| Resol Resin (49.4% d.b.) | 34.8 |
| 50% NaOH | 9.4 |
| Sodium Carbonate | 3.6 |
| Resol Resin (49.4% d.b.) | 121.9 |

Final adhesive viscosity is about 3,100 centipoise. The adhesive was then applied to three 12 × 12 inches sheets of Douglas Fir or Southern Pine veneer at a level of 63 lb/1000 ft.² per glue line. The plies were stacked together and cured in a preheated press (285° F.) at 175 psi for the minimum time to cure the adhesive (usually about 4½ minutes).

The laminates prepared using the novel resol resins of the example showed excellent water resistance in boiling water for 18 hours without delamination.

EXAMPLE 14

This example illustrates the preparation of the resol resin of this invention starting with starch hydrolysate or corn syrup.

332 g. of starch hydrolysate at about 81% dry substance by weight was placed in a reaction flask at about 85° C. and 8.1 g. of 5 Normal $H_2SO_4$ acid was added. The reaction was held for 2 hours to begin breakdown to dextrose and then 45 g. of urea, and 156 g. of phenol (90% by weight) was added. The reaction was allowed to proceed at 112° – 163° C. for about 6 hours during which time 152 g. of water was collected using a water cooled condenser. This resin was a dark liquid product.

This liquid resin was cooled to about 90° C. and the water of condensation returned to the reaction flask. At this point 13.0 g. of calcium hydroxide was added to neutralize the acid and to provide a basic catalyst system. Reaction temperature was cooled to about 70° C. and 375 g. of aqueous 35% (by weight) formaldehyde was added.

The reaction was held with stirring until the exotherm subsided. The reaction was then held for about 1 hour at about 80° C. The resol resin was then cooled to room temperature and was a liquid product having a viscosity of about 500 centipoise. Final solids content was 51.4% by weight.

Plywood adhesive formulations were prepared as shown in Example 13. The resulting finished laminates prepared using this resol resin showed good water resistance in boiling water for about 2 hours without delamination.

EXAMPLE 15

This example further illustrates the preparation of resol resins of this invention wherein formaldehyde is added to a dextrose-diureide-phenol liquid resin. Moreover, this example shows other molar ratios for reactants and the results obtained in plywood laminates prepared using the novel resol resins of this invention The liquid resin and resol resin formation as shown in the procedures of Example 12 were used with the exception of different molar ratios with the results summarized in the following table:

| Removed Moles[1] $H_2O$ | Dextrose Moles | Urea Moles | Phenol Moles | HCHO Moles | Boiling Water[3] Delamination (Hrs.) |
|---|---|---|---|---|---|
| 2.6 | 1.5 | 0.75 | 1.5 | 3.75 | < 1 |
| 2.6 | 1.5 | 0.75 | 1.5 | 4.5 | > 18 |
| 2.6 | 1.5 | 0.75 | 1.5 | 5.25 | > 6 |
| 3.6 | 1.5 | 0.75 | 1.5 | 5.25 | > 18 |
| 2.5 | 1.5[2] | 0.75 | 1.5 | 3.75 | > 2 |

[1] Moles $H_2O$ removed by condensation in the 1st stage or intermediate resin production.
[2] Starch hydrolysate calculated as moles dextrose.
[3] Boiling water delamination with a 3 1/4 inch × 1 inch strip 3 ply laminate showing approximate holding time in boiling water until delamination.

While the invention has been described in connection with specific embodiments thereof, it will be understood that it is capable of further modification, and this application is intended to cover any variation, uses, or adaptions of the invention following, in general, the principles of the invention and including such departures from the present disclosure as come within known or customary practice in the art to which the invention pertains and as may be applied to the essential features hereinbefore set forth, as fall within the scope of the invention.

We claim:

1. A process for producing a carbohydrate-phenolic resol resin which comprises the steps of:
   a. reacting in the presence of an acid catalyst the following ingredients:
      1. an aldose saccharide
      2. a phenolic compound having the formula

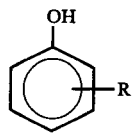

wherein R is selected from the group consisting of $C_1$ to $C_3$ alkyl, $C_1$ to $C_3$ alkoxy, halogen, hydroxy and hydrogen, and 3. urea to form a liquid resin wherein the water produced in condensation is less than about 5 moles per mole of aldose; and
   b. reacting said liquid resin with a lower aliphatic aldehyde in the presence of a basic catalyst to form said resol resin.

2. A process as defined in claim 1 wherein the aldose saccharide is a hexose.

3. A process as defined in claim 1 wherein the phenolic compound is phenol.

4. A process as defined in claim 1 wherein the aldose saccharide is derived from starch.

5. A process as defined in claim 1 wherein the phenolic compound is employed in an amount within the range of 0.1 to 1.5 moles of phenolic compound for each mole of aldose unit.

6. A process as defined in claim 1 wherein the urea is employed in an amount from 0.1 to 5 moles of urea for each mole of aldose unit.

7. A process as defined in claim 1 wherein the aliphatic aldehyde is employed in an amount ranging from about 2 moles to about 4 moles for each mole of phenol.

8. A process as defined in claim 1 wherein the acid catalyst is a strong mineral acid.

9. A process as defined in claim 1 wherein the alkaline catalyst is calcium hydroxide.

10. A process as defined in claim 1 wherein the aliphatic aldehyde is formaldehyde.

11. A carbohydrate-phenolic resol resin produced by the process defined in claim 1.

12. A process as defined in claim 1 wherein the aldose saccharide is reacted with urea prior to contact with the phenolic compound.

* * * * *